US008989529B2

(12) United States Patent
Kim et al.

(10) Patent No.: US 8,989,529 B2
(45) Date of Patent: Mar. 24, 2015

(54) PRINTED CIRCUIT BOARD FOR OPTICAL WAVEGUIDES AND METHOD OF MANUFACTURING SAME

(75) Inventors: Sang Hoon Kim, Gyunggi-do (KR); Han Seo Cho, Seoul (KR); Jae Hyun Jung, Gyunggi-do (KR); Joon Sung Kim, Gyunggi-do (KR)

(73) Assignee: Samsung Electro-Mechanics Co., Ltd., Gyunnggi-Do (KR)

( * ) Notice: Subject to any disclaimer, the term of this patent is extended or adjusted under 35 U.S.C. 154(b) by 479 days.

(21) Appl. No.: 12/553,899

(22) Filed: Sep. 3, 2009

(65) Prior Publication Data

US 2010/0316330 A1 Dec. 16, 2010

(30) Foreign Application Priority Data

Jun. 12, 2009 (KR) .................. 10-2009-0052475

(51) Int. Cl.
  *G02B 6/12* (2006.01)
  *G02B 6/138* (2006.01)

(52) U.S. Cl.
  CPC ...................... *G02B 6/138* (2013.01)
  USPC .......................................................... 385/14

(58) Field of Classification Search
  USPC .................... 385/14; 264/1.28, 1.27
  See application file for complete search history.

(56) References Cited

U.S. PATENT DOCUMENTS

| | | | | |
|---|---|---|---|---|
| 6,731,856 B1 * | 5/2004 | Fujita et al. | ................. | 385/143 |
| 7,039,288 B2 * | 5/2006 | Wang et al. | ................. | 385/132 |
| 7,076,135 B2 * | 7/2006 | Yamada et al. | ................. | 385/43 |
| 7,604,758 B2 * | 10/2009 | Akutsu et al. | ................. | 264/1.24 |
| 7,801,396 B2 * | 9/2010 | Yonekura et al. | ................. | 385/14 |
| 8,265,445 B2 * | 9/2012 | Kim et al. | ................. | 385/132 |
| 2002/0150368 A1 * | 10/2002 | Imoto | ................. | 385/132 |
| 2005/0158002 A1 * | 7/2005 | Kubby et al. | ................. | 385/129 |
| 2005/0196095 A1 * | 9/2005 | Karashima et al. | ................. | 385/14 |
| 2006/0188207 A1 * | 8/2006 | Jung et al. | ................. | 385/129 |

(Continued)

FOREIGN PATENT DOCUMENTS

JP 05019147 A * 1/1993 .............. G02B 6/44
JP 2004-311736 11/2004

(Continued)

OTHER PUBLICATIONS

Machine translation of KR 10-2005-0040589 A, above.*

(Continued)

*Primary Examiner* — Andrew Jordan
(74) *Attorney, Agent, or Firm* — Bracewell & Giuliani LLP; Brad Y. Chin

(57) ABSTRACT

Disclosed herein is a printed circuit board for an optical waveguide, including: a lower substrate; an insulation layer which has a through-hole and is formed on the lower substrate; an optical waveguide which is formed in the through-hole such that a clearance is present between the optical waveguide and an inner wall of the through-hole; and an adhesive material which is charged in the clearance. The printed circuit board for an optical waveguide is advantageous in that a lower clad material, a core material and an upper clad material are sequentially applied on the lower substrate partially, not entirely, based on the region in which a core is formed, and is then patterned to form an optical waveguide, so that the amounts of the lower and upper clad materials and the core material, which are used to form the optical waveguide, can be greatly decreased.

11 Claims, 6 Drawing Sheets

(56) References Cited

U.S. PATENT DOCUMENTS

| | | | |
|---|---|---|---|
| 2008/0205899 A1* | 8/2008 | Kopp et al. | 398/139 |
| 2009/0232467 A1* | 9/2009 | Kim et al. | 385/142 |
| 2010/0316330 A1* | 12/2010 | Kim et al. | 385/14 |
| 2011/0085771 A1* | 4/2011 | Matsuyama et al. | 385/125 |

FOREIGN PATENT DOCUMENTS

| | | | |
|---|---|---|---|
| JP | 2006098731 A | * | 4/2006 |
| KR | 1020050040589 | | 5/2004 |
| KR | 10-2005-0040589 A | * | 5/2005 |

OTHER PUBLICATIONS

Office Action from counterpart Korean Patent Application No. 10-2009-0052475, Feb. 18, 2011, 5 pages.

* cited by examiner

PRINTED CIRCUIT BOARD FOR OPTICAL WAVEGUIDES AND METHOD OF MANUFACTURING SAME

CROSS REFERENCE TO RELATED APPLICATION

This application claims the benefit of Korean Patent Application No. 10-2009-0052475, filed Jun. 12, 2009, entitled "Printed circuit board for optical waveguides and method of manufacturing the same", which is hereby incorporated by reference in its entirety into this application.

BACKGROUND OF THE INVENTION

1. Technical Field

The present invention relates to a printed circuit board for an optical waveguide and a method of manufacturing the same.

2. Description of the Related Art

Recently, there has been a rapid increase in demand for an optical substrate which includes wiring for transmitting electrical and optical signals to mobile or network appliances which require high-speed data transmission.

Generally, an optical substrate is made of a polymer having low light transmittance, and includes a square-section core having a width in which signals are really transmitted and a thickness of 50 μm and a clad covering the core. The square-section core is generally fabricated through a photo-etching process.

In relation to this, a conventional method of manufacturing a printed circuit board for an optical waveguide will be described as follows with reference to FIGS. 1A, 1B and 1C.

First, a soft substrate comprising a copper foil 11 and a polyimide layer 12 is prepared, and a lower clad layer 13 and a core layer 14 are sequentially formed on the polyimide layer 12 of the soft substrate (refer to FIG. 1A).

Subsequently, the core layer 14 is patterned through a photo-etching process to form cores 14a (refer to FIG. 1B).

Finally, an upper clad layer 15 is formed on the lower clad layer 13 on which the cores 14a are formed, thus completing a printed circuit board for an optical waveguide (refer to FIG. 1C).

According to the above conventional method, there is a problem in that the entire work size substrate is coated with a core material to form a core layer 14, and then the core layer 14 is patterned through exposure/development to form cores 14a, so that a very large amount of the core material is removed compared to the amount of the really necessary core 14a, thereby increasing the material cost outlay.

Furthermore, there is a problem in that, although lower and upper clad layers are sufficient to cover cores 14a to such a degree that the optical signal transmission of the cores 14a is easily achieved, a clad material is entirely applied on the substrate, so that the clad material is excessively used.

In particular, considering that raw materials of optical substrates are high-priced, methods of economically and efficiently manufacturing an optical substrate are keenly required.

SUMMARY OF THE INVENTION

Accordingly, the present invention has been made to solve the above-mentioned problems, and the present invention provides a printed circuit board for an optical waveguide, which can decrease the production costs thereof by decreasing the used amounts of a core material and clad material, and a method of manufacturing the same.

An aspect of the present invention provides a printed circuit board for an optical waveguide, including: a lower substrate; an insulation layer which has a through-hole and is formed on the lower substrate; an optical waveguide which is formed in the through-hole such that a clearance is present between the optical wave guide and an inner wall of the through-hole; and an adhesive material which is charged in the clearance.

In the printed circuit board for an optical waveguide, the optical waveguide may include a lower clad layer which is formed in a bottom of the through-hole such that a clearance is present between the lower clad layer and an inner wall of the through-hole, a core which is formed on the lower clad layer, and an upper clad layer which is formed on the lower clad layer and the core to cover an exposed surface of the core.

The printed circuit board for an optical waveguide may further include an upper substrate layered on the insulation layer.

The insulation layer may be made of any one selected from the group consisting of a thermosetting resin, a thermoplastic resin, a thermosetting resin impregnated with a reinforcing material, a thermoplastic resin impregnated with a reinforcing material and combinations thereof.

The core may have a plurality of patterns.

The lower substrate or the upper substrate may be any one selected from among an insulation substrate, a metal layer for forming a circuit, a rigid printed circuit board, a flexible printed circuit board and a rigid-flexible printed circuit board.

The lower substrate or the upper substrate may include a polyimide layer and circuit patterns for transmitting electrical signals formed on one or both sides of the polyimide layer.

Another aspect of the present invention provides a method of manufacturing a printed circuit board for an optical waveguide, including: forming an optical waveguide including a lower clad layer, a core and an upper clad layer on a lower substrate; forming an insulation layer having a through-hole for housing the optical waveguide on the lower substrate such that a clearance is present between the optical waveguide and an inner wall of the through-hole; and charging the clearance with an adhesive material.

In the method, the forming of the optical waveguide may include: applying a lower clad material on the lower substrate and then patterning the lower clad material to form the lower clad layer; applying a core material on the lower clad layer and then patterning the core material to form the core; and applying an upper clad material on the core and then patterning the upper clad material to form the upper clad layer.

Further, the forming of the optical waveguide may include: applying a lower clad material on the lower substrate; irradiating a portion of the lower clad material, which is to be formed into the lower clad layer, with UV or heat to cure the portion of the lower clad material; applying a core material on the lower clad material; irradiating a portion of the core material, which is to be formed into the core, with UV or heat to cure the portion of the core material; removing uncured portions of the lower clad material and core material to form the lower clad layer and the core; and applying an upper clad material on the lower clad layer and the core and then patterning the upper clad material to form the upper clad layer.

Further, the forming of the optical waveguide may include: applying a lower clad material on the lower substrate and then patterning the lower clad material to form the lower clad layer; applying a core material on the lower clad layer and then curing the core material; laser-machining the core material applied on the lower clad layer to form the core; and applying an upper clad material on the lower clad layer and the core and then patterning the upper clad material to form the upper clad layer.

In the method, in the charging of the clearance with the adhesive material, the clearance is charged with the adhesive material while an upper substrate coated on one side thereof with the adhesive material is applied onto the insulation layer.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1A:
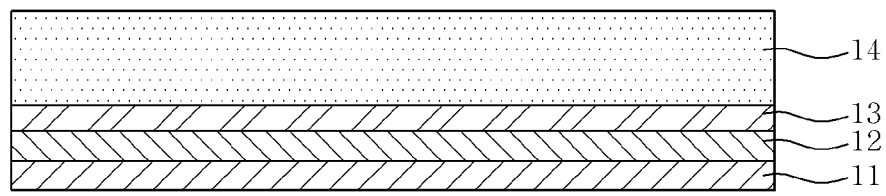
FIGS. 1A to 1C are sectional views showing a conventional method of manufacturing a printed circuit board for an optical waveguide.
Figure 1B:
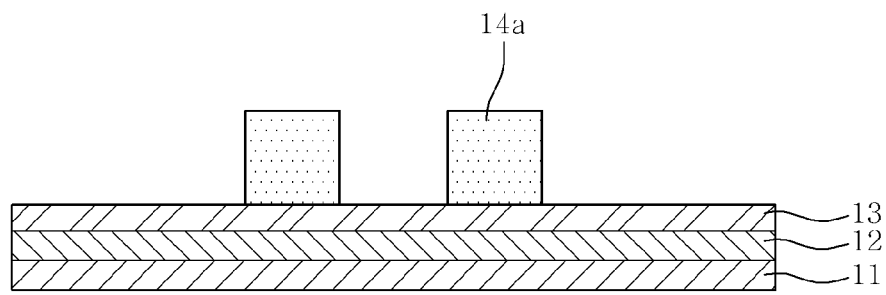
Figure 1C:
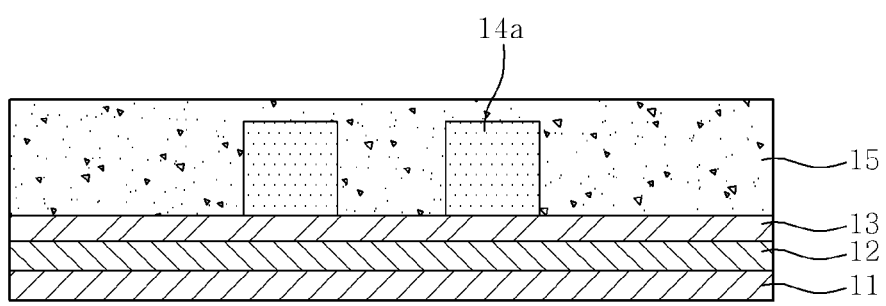

Hereinafter, preferred embodiments of the present invention will be described in detail with reference to the attached drawings.

Throughout the accompanying drawings, the same reference numerals are used to designate the same or similar components, and redundant descriptions thereof are omitted. In the following description, the terms "upper", "lower" and the like are used to differentiate a certain component from other components, but the configuration of such components should not be construed to be limited by the terms.

FIGS. 2 to 17 are sectional views showing a method of manufacturing a printed circuit board for an optical waveguide according to an embodiment of the present invention.

First, a process of forming an optical waveguide including a lower clad layer 310, a core 330 and an upper clad layer 350 on a lower substrate 100 is described.

Figure 2:
FIGS. 2 to 17 are sectional views showing a process of manufacturing a printed circuit board for an optical waveguide.

First, as shown in FIG. 2, a lower substrate 100 is provided. The lower substrate 100 may be an insulating substrate made of an electrical insulating material, for example, an epoxy resin. However, the lower substrate 100 may include a circuit layer 110 (refer to FIGS. 14 and 15) for transmitting electrical signals. In addition to the insulating substrate 100, a metal layer for forming a circuit, a rigid printed circuit board, a flexible printed circuit board or a rigid-flexible printed circuit board may be used as the lower substrate 100. For example, the lower substrate 100 may be a flexible printed circuit board including a polyimide layer and circuit patterns for transmitting electrical signals formed on one or both sides of the polyimide layer.

Figure 3:
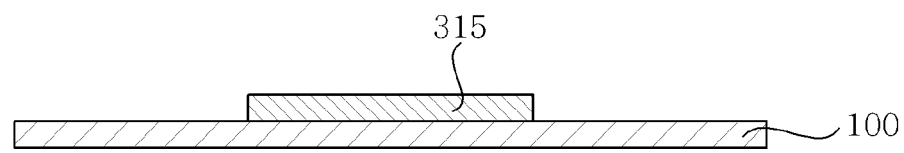

Subsequently, as shown in FIG. 3, a lower clad material 315 is applied on the lower substrate 100. The lower clad material 315 may be applied on the lower substrate 100 in a semi-cured film state or a liquid film through a commonly-known method, such as dispensing, ink jetting, printing, roll coating or the like. When a liquid lower clad material is used as the lower clad material 315, a process of flattening the lower clad material 315 by layering a transparent release film thereon may be additionally performed after the lower clad material 315 is applied on the lower substrate 100.

Figure 4:
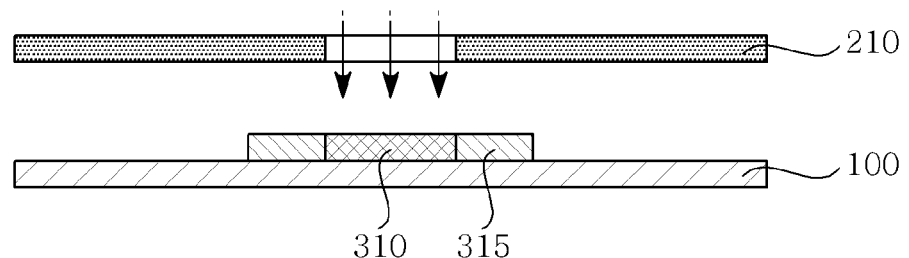

Subsequently, as shown in FIG. 4, among the lower clad material 315, a portion to be formed into a lower clad layer 310 is cured by irradiating the portion with UV or heat. Further, the lower clad material 315 may be selectively cured using a first mask 210 having an opening corresponding to the lower clad layer 310. However, when the size of the lower clad material 315 is equal to that of the lower clad layer 310 to be formed, the entire lower clad material 315 is cured without using a mask.

Figure 5:
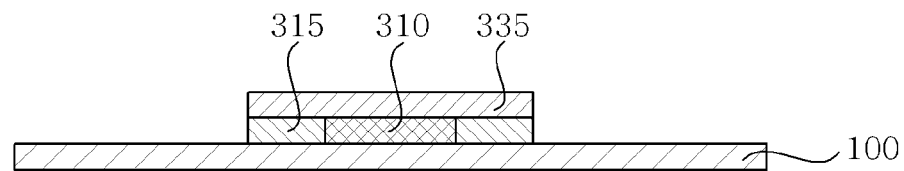

Subsequently, as shown in FIG. 5, a core material 335 is applied on the lower clad material 315. The core material 335 is applied on the lower clad material 315 through a commonly-known method, such as dispensing, ink jetting, printing, roll coating or the like, and is then pre-baked. In this case, the amount of the core material 335 is determined by considering the height of a core 330 to be formed later.

Figure 6:
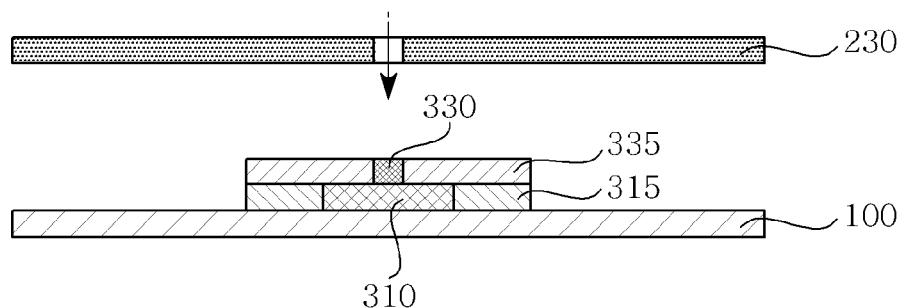

Subsequently, as shown in FIG. 6, among the core material 335, a portion to be formed into the core 330 is cured by irradiating the portion with UV or heat. The core material 335 may be selectively exposed using a second mask 230 having an opening corresponding to the core 330, and, if necessary, post exposure baking (PEB) may be performed before or after the exposure of the core material 335.

Before the exposure of the core material 335, for example, the core material 335 may be flattened in such a manner that a transparent release film is layered on the core material 335. The transparent release film can be used without limitation as long as it is a material which can prevent the core material 335 from being contaminated by extraneous materials, can flatten the core material 335, can allow light to be transmitted to the core material 335 therethrough during a subsequent exposure process and can be easily removed after the exposure process. Further, the core material 335 may be a liquid core material or a film-state core material.

Figure 7:
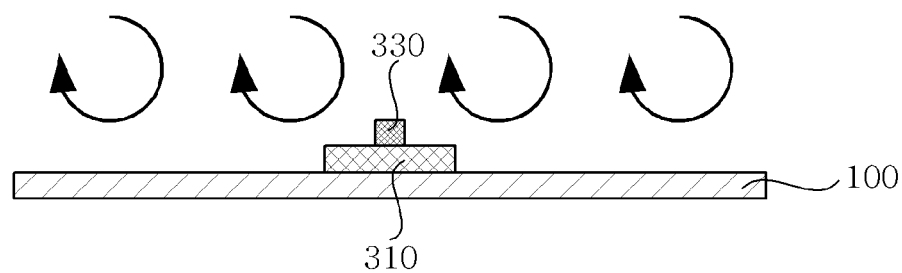

Subsequently, as shown in FIG. 7, the uncured lower clad material 315 and core material 335 are removed to form the lower clad layer 310 and the core 330. In this embodiment, a process of simultaneously developing the lower clad material 315 and the core material 335 is described as an example. However, the present invention is not limited thereto, and a process of forming the core 330 after the patterning of the lower clad material 315, that is, after the exposure and development of the lower clad material 315, can be performed. Further, the process of forming the core 330 can be performed using laser direct patterning in addition to the exposure and development. In the laser direct patterning, the core material 335 applied on the lower clad layer 310 is cured, and is then formed into the core 330 using a laser.

Figure 8:
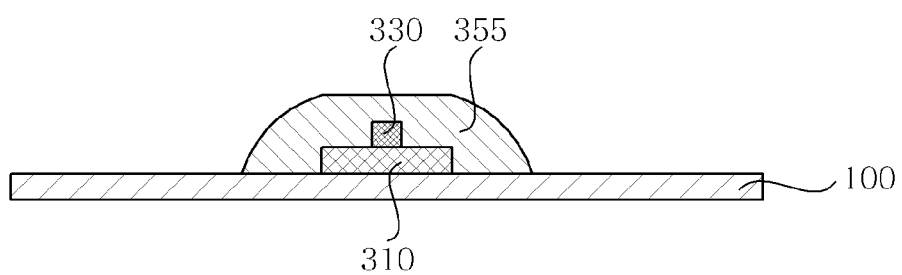
Figure 9:
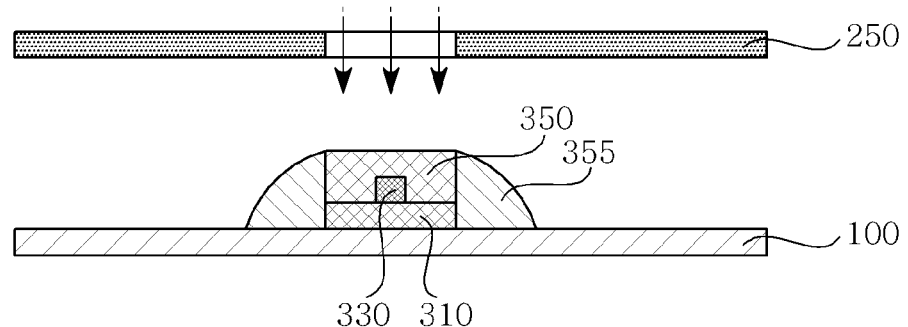
Figure 10:
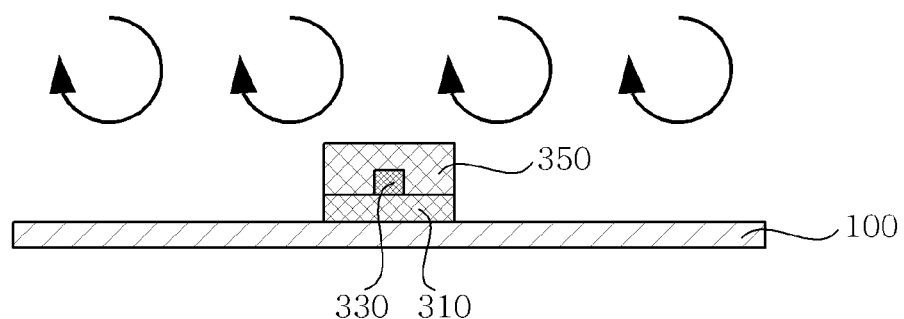

Next, a process of applying an upper clad material 355 on the lower clad layer 310 and the core 330 and then pattering the same is described. The upper clad material 355 may also be a semi-cured film or a liquid upper clad material. As shown in FIG. 8, the upper clad material 355 is applied on the lower clad layer 310 and the core 330, and then, as shown in FIG. 9, the upper clad material 355 is exposed using a third mask 250, and then, as shown FIG. 10, a development process is performed to form an upper clad layer 350, thereby forming an optical waveguide on the lower substrate 100. In this case, the upper clad layer 350 may be formed to such a degree that it can just barely cover the core 330 at a minimum.

Figure 11:
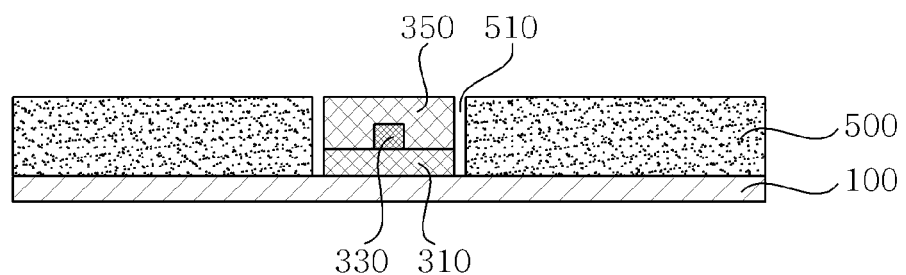

Subsequently, as shown in FIG. 11, an insulation layer 500 having a through-hole 510 for housing an optical waveguide is formed on the lower substrate 100 such that a clearance is present between the optical wave guide and the inner wall of the through-hole. The insulation layer 500 may be made of any one selected from among a thermosetting resin, a thermoplastic resin, a thermosetting resin impregnated with a reinforcing material, a thermoplastic resin impregnated with a reinforcing material and combinations thereof. Specific examples of the insulation layer 500 may include, but are not limited to, a prepreg, a polyimide film, a photosensitive insulating film and the like, which are commonly used in the fields of printed circuit boards.

The insulation layer has a through-hole 510 which can house the above optical waveguide. A method of forming the through-hole 510 in the insulation layer 500 is not particularly limited, and can be appropriately employed depending on the kinds of the materials constituting the insulation layer 500. For example, the through-hole 510 can be formed in the insulation layer 500 through a photo-etching method or a laser processing method using an exposure/development process. It is preferred that the through-hole 510 have a width larger than that of the optical waveguide in consideration of the matching error between the through-hole 510 and the optical waveguide. Since the width of the through-hole 510 is larger than that of the optical waveguide, a clearance is present between the inner wall of the through-hole 510 and the optical waveguide.

Figure 12:
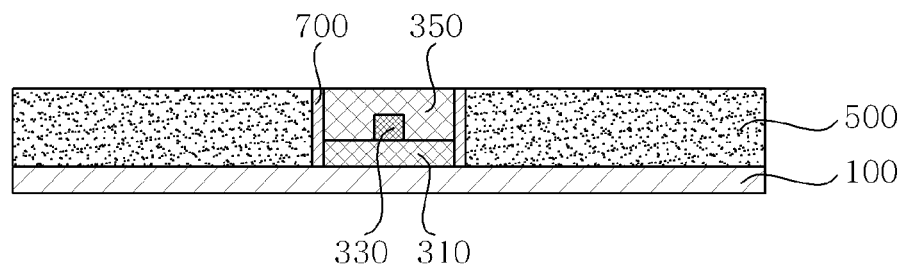

Subsequently, as shown in FIG. 12, the clearance is charged with an adhesive material 700. Since it is not preferred that a void, such as the clearance, be present in a printed circuit board, the clearance is charged with the adhesive material 700. The adhesive material may be an epoxy resin.

Figure 13:
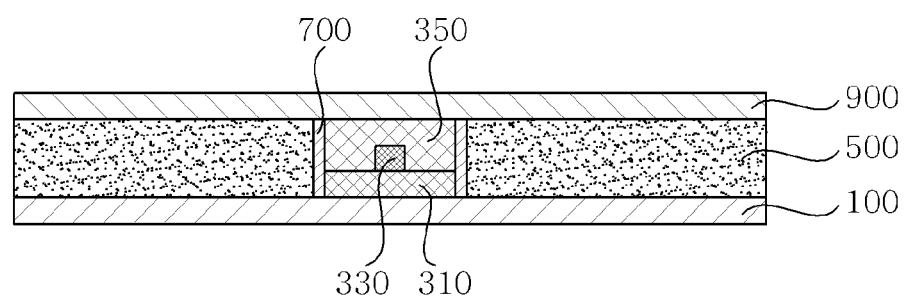

Subsequently, as shown in FIG. 13, an upper substrate 900 is layered on the insulation layer 500. The upper substrate 900, similar to the lower substrate 100, may be an insulating substrate, a metal layer for forming a circuit, a rigid printed circuit board, a flexible printed circuit board or a rigid-flexible printed circuit board. For example, the upper substrate 900 may be a flexible printed circuit board including a polyimide layer and circuit patterns for transmitting electrical signals formed on one or both sides of the polyimide layer.

Figure 14:
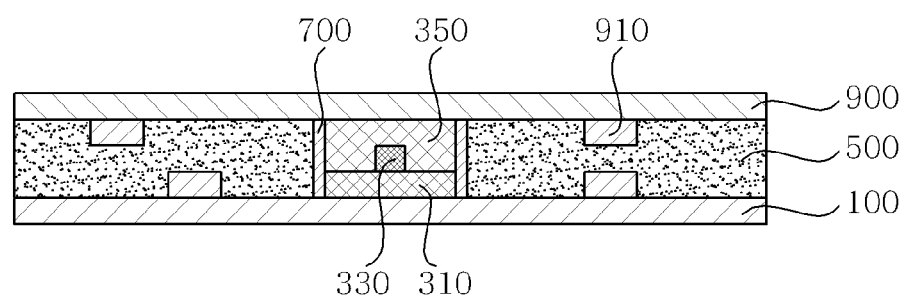
Figure 15:
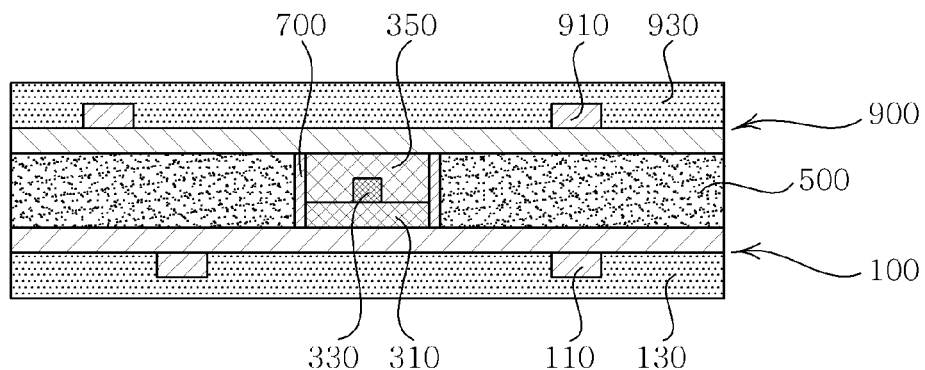

FIG. 14 shows a sectional printed circuit board including circuit layers 110 and 910 which are buried in the insulation layer 500 and formed on one side of each of the lower substrate 100 and upper substrate 900, and FIG. 15 shows a sectional printed circuit board including circuit layers 110 and 910 which are formed on one side of each of the lower substrate 100 and upper substrate 900 and is respectively covered with additional insulation layers 130 and 930.

Figure 16:
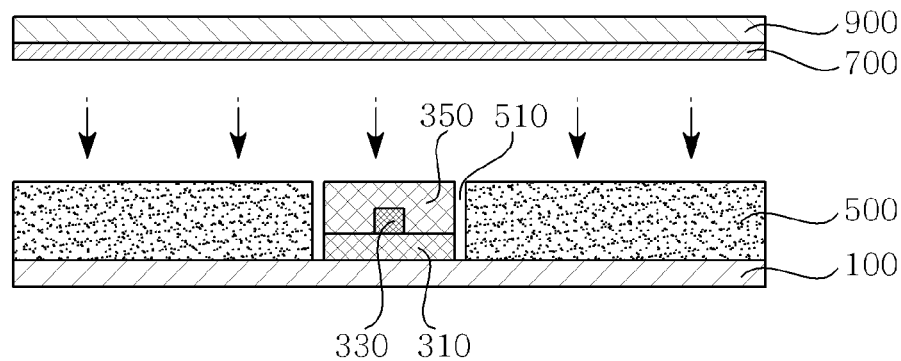
Figure 17:
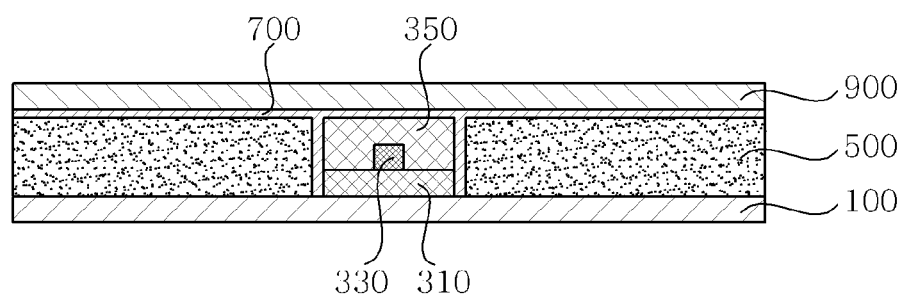

Meanwhile, as shown in FIGS. 16 and 17, the upper substrate 900 coated on onside thereof with the adhesive material 700 is pressed onto the insulation layer 500, and thus the layering of the upper substrate 900 and the charging of clearance can be simultaneously performed. Further, although not shown, the insulation layer 500 and the upper substrate 900 can be formed on the lower substrate 100 simultaneously, not sequentially.

According to the above embodiment, he lower clad material 315, core material 335 and upper clad material 355 are sequentially applied on the lower substrate 100 partially, not entirely, based on the region in which the core is formed, and is then patterned to form an optical waveguide, so that the amounts of the lower and upper clad materials 315 and 355 and the core material 335, which are used to form the optical waveguide, can be greatly decreased.

Further, according to the above embodiment, an optical waveguide can be accurately formed at a desired position and in a desired size because the optical waveguide is formed on the lower substrate 100 in a state in which the position at which the optical waveguide is to be formed is not limited before the formation of the insulation layer 500, and a process of forming an optical waveguide can be simplified because a semi-cured film state clad material is used to form the optical waveguide.

Hereinafter, a structure of a printed circuit board for an optical waveguide according to another embodiment will be described with reference to FIGS. 12 to 15 and 17. Here, the description duplicated by the above-mentioned embodiment is omitted.

As shown in FIG. 12. a printed circuit board for an optical waveguide according to this embodiment includes a lower substrate 100, an insulation layer 500 which has a through-hole 510 and is formed on the lower substrate 100, an optical waveguide which is formed in the through-hole 510 such that a clearance is present between the optical wave guide and the inner wall of the through-hole 510, and an adhesive material 700 which is charged in the clearance.

The lower substrate 100, as described above, may be a metal layer for forming a circuit or an insulating substrate made of an electrical insulating material. Further, the lower substrate 100, as shown in FIGS. 14 and 15, may be a rigid printed circuit board, a flexible printed circuit board or a rigid-flexible printed circuit board, each of which includes circuit layers 110 and 910 for transmitting electrical signals.

The optical waveguide serves to transmit optical signals, and includes a lower clad layer 310 which is formed in the bottom of the through-hole 510 such that a clearance is present between the lower clad layer 310 and the inner wall of the through-hole 510, a core 330 which is formed on the lower clad layer 310, and an upper clad layer 350 which is formed on the lower clad layer 310 and the core 330 to cover the exposed surface of the core 330.

Here, the lower clad layer 310 is made of a polymer material, such as an acrylic resin, an epoxy resin, a polyimide resin, a fluorinated acrylic resin, a fluorinated polyimide resin or the like, and is formed to have a thickness of 10~100 μm. The core 330, similarly to the lower clad layer 310 or upper clad layer 350, is also made of a polymer material, but is made of a material having a refractive index higher than that of the material constituting the lower clad layer 310 or upper clad layer 350 in order to efficiently transmit optical signals. In this embodiment, although the core 330 has a single pattern, the core 330 may have a plurality of patterns. The upper clad layer 350 is formed on the lower clad layer 310 and the core 330 to cover the exposed surface of the core 330, and is made of a material the same as or similar to the material constituting the lower clad layer 310.

The insulation layer 500 may be made of any one selected from among a thermosetting resin, a thermoplastic resin, a thermosetting resin impregnated with a reinforcing material, a thermoplastic resin impregnated with a reinforcing material and combinations thereof. Specific examples of the insulation layer 500 may include, but are not limited to, a prepreg, a polyimide film, a photosensitive insulating film and the like, which are commonly used in the fields of printed circuit boards. The insulation layer 500 has a through-hole 510 which can house the above-mentioned optical waveguide. The through-hole 510 has a width larger than that of the optical waveguide in consideration of the matching error between the through-hole 510 and the optical waveguide.

Since the width of the through-hole 510 is larger than that of the optical waveguide, a clearance is present between the inner wall of the through-hole 510 and the optical waveguide.

The adhesive material 700 is charged in the clearance formed between the inner wall of the through-hole 510 and the optical waveguide, and may be made of an epoxy resin.

Meanwhile, the above-mentioned printed circuit board for an optical waveguide may further include an upper substrate 900 layered on the insulation layer 500. The upper substrate 900 may be a metal layer for forming a circuit or an insulating substrate made of an electrical insulating material. Further, the upper substrate 900, as shown in FIGS. 14 and 15, may be a rigid printed circuit board, a flexible printed circuit board or a rigid-flexible printed circuit board, each of which includes circuit layers for transmitting electrical signals.

The above-mentioned printed circuit board can transmit electrical signals through the circuit patterns formed on the lower substrate 100 or the upper substrate 900 and can transmit optical signals through the optical waveguide. In this case, optical signals are incident on the core 330 through light-transmitting portions formed on the lower substrate 100 or the upper substrate 900, and are then totally reflected by the lower clad layer 310 and the upper clad layer 350 and simultaneously transmitted along the core 330. The totally reflected optical signals are further reflected by a mirror (not shown) and then go to the outside.

As described above, according to the present invention, a lower clad material, a core material and an upper clad material are sequentially applied on a lower substrate partially, not entirely, based on the region in which a core is formed, and is then patterned to form an optical waveguide, so that the amounts of the lower and upper clad materials and the core material, which are used to form the optical waveguide, can be greatly decreased.

Further, according to the present invention, an optical waveguide can be accurately formed at a desired position and in a desired size because the optical waveguide is formed on a lower substrate in a state in which the position at which the optical waveguide is to be formed is not limited before the formation of an insulation layer, and a process of forming an optical waveguide can be simplified because a semi-cured film state clad material is used to form the optical waveguide.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A printed circuit board for an optical waveguide, comprising:
    a lower substrate;
    a plate shaped insulation layer which has a through-hole and is formed on an entire surface of the lower substrate;
    an optical waveguide which is formed in the through-hole such that a clearance is present between the optical waveguide and an inner wall of the through-hole and a side thereof is in a shape of a square;
    an adhesive material in the clearance; and
    a plate shaped upper substrate layered on an entire surface of the insulation layer including an insulation substrate and metal layer for forming a circuit,
    wherein a thickness of the insulation layer is substantially the same as a thickness of the optical waveguide.

2. The printed circuit board for an optical waveguide according to claim 1, wherein the optical waveguide includes:
    a lower clad layer which is formed in a bottom of the through-hole such that a clearance is present between the lower clad layer and an inner wall of the through-hole;
    a core which is formed on the lower clad layer; and
    an upper clad layer which is formed on the lower clad layer and the core to cover an exposed surface of the core.

3. The printed circuit board for an optical waveguide according to claim 1, wherein the insulation layer is made of any one selected from the group consisting of a thermosetting resin, a thermoplastic resin, a thermosetting resin impregnated with a reinforcing material, a thermoplastic resin impregnated with a reinforcing material and combinations thereof.

4. The printed circuit board for an optical waveguide according to claim 1, wherein the lower substrate or the upper substrate is any one selected from among an insulation substrate, a metal layer for forming a circuit, a rigid printed circuit board, a flexible printed circuit board and a rigid-flexible printed circuit board.

5. The printed circuit board for an optical waveguide according to claim 1, wherein the lower substrate or the upper substrate includes a polyimide layer and circuit patterns for transmitting electrical signals formed on one or both sides of the polyimide layer.

6. The printed circuit board for an optical waveguide according to claim 1, wherein the width of the through-hole is wider than the one of the optical waveguide.

7. A method of manufacturing a printed circuit board for an optical waveguide, comprising:
    forming an optical waveguide having sides thereof in a shape of a square and including a lower clad layer, a core and an upper clad layer on some parts of a lower substrate;
    arranging the optical waveguide in a through-hole by forming a plate shaped insulation layer having the through-hole for housing the optical waveguide on the lower substrate including the optical waveguide such that a clearance is present between the optical waveguide and an inner wall of the through-hole; and
    putting an adhesive material in the clearance, wherein the lower clad layer and the upper clad layer are formed only around the core;
    wherein the lower clad layer is formed on some parts of the lower substrate, the core is formed on some parts of the lower clad layer and the upper clad layer is formed on the lower clad layer covering the core.

8. The method of manufacturing a printed circuit board for an optical waveguide according to claim 7, wherein the forming of the optical waveguide comprises:
    applying a lower clad material on the lower substrate and then patterning the lower clad material to form the lower clad layer;
    applying a core material on the lower clad layer and then patterning the core material to form the core; and
    applying an upper clad material on the lower clad layer and the core and then patterning the upper clad layer to form a structure having the upper and lower clad layers around the core.

9. The method of manufacturing a printed circuit board for an optical waveguide according to claim 7, wherein the forming of the optical waveguide comprises:
    applying a lower clad material on some parts of the lower substrate;
    irradiating a portion of the lower clad material, which is to be formed into the lower clad layer, with UV or heat to cure the portion of the lower clad material;

applying a core material on the lower clad material;

irradiating a portion of the core material, which is to be formed into the core, with UV or heat to cure the portion of the core material;

removing uncured portions of the lower clad material and core material to form the lower clad layer and the core; and applying an upper clad material on the lower clad layer and the core and then patterning the lower clad layer and the upper clad layer to be formed only around the core;

wherein the lower clad layer is formed on some parts of the lower substrate, the core is formed on some parts of the lower clad layer and the upper clad layer is formed on the lower clad layer covering the core.

10. The method of manufacturing a printed circuit board for an optical waveguide according to claim 7, wherein the forming of the optical waveguide comprises:

applying a lower clad material on some parts of the lower substrate and then removing an uncured lower clad material after curing the lower clad material on a portion to be formed into a lower clad layer;

applying a core material on the lower clad layer and then curing the core material;

laser-machining the core material applied on the lower clad layer to form the core; and applying an upper clad material on the lower clad layer and the core and then removing an uncured upper clad material after curing the upper clad material on a portion to be formed into an upper clad layer, wherein the lower clad layer is formed on some parts of the lower substrate, the core is formed on some parts of the lower clad layer and the upper clad layer is formed on some parts of the lower clad layer covering the core.

11. The method of manufacturing a printed circuit board for an optical waveguide according to claim 7, wherein, in the charging of the clearance with the adhesive material, the clearance is charged with the adhesive material while an upper substrate coated on one side thereof with the adhesive material is applied onto the insulation layer.

* * * * *